United States Patent [19]

Cowburn et al.

[11] Patent Number: 4,887,841
[45] Date of Patent: Dec. 19, 1989

[54] VEHICLE SUSPENSION

[75] Inventors: David Cowburn, Sedgley, United Kingdom; Stephen P. Rawlings, Lake Orion, Mich.; Andrew Pollard, Bridgnorth, United Kingdom

[73] Assignee: GKN Technology Limited, West Midlands, England

[21] Appl. No.: 203,454
[22] PCT Filed: Apr. 16, 1987
[86] PCT No.: PCT/GB87/00260
§ 371 Date: Jun. 6, 1988
§ 102(e) Date: Jun. 6, 1988
[87] PCT Pub. No.: WO87/06539
PCT Pub. Date: Nov. 5, 1987

[30] Foreign Application Priority Data

Apr. 23, 1986 [GB] United Kingdom ............... 8609920
Jul. 2, 1986 [GB] United Kingdom ............... 8616182
Nov. 19, 1986 [GB] United Kingdom ............... 8627640

[51] Int. Cl.⁴ .................... B60G 11/08; F16F 1/36
[52] U.S. Cl. ........................ 280/719; 267/36.1; 267/148; 280/694
[58] Field of Search ........... 280/691, 694, 699, 669, 280/718, 719, 720; 267/148, 149, 46, 36.1

[56] References Cited

U.S. PATENT DOCUMENTS

| 1,573,583 | 2/1926 | Smith | 267/46 |
| 1,975,836 | 10/1934 | Ford | 280/719 |
| 3,197,190 | 7/1965 | Miyashiro | 280/699 |
| 3,601,425 | 8/1971 | Sampietro | 280/719 |
| 3,710,882 | 1/1973 | Marceau | 280/669 |
| 4,732,371 | 3/1988 | Pfederer | 267/148 |

FOREIGN PATENT DOCUMENTS

| 0083182 | 7/1983 | European Pat. Off. . | |
| 1805219 | 5/1969 | Fed. Rep. of Germany | 280/669 |
| 2927486 | 1/1981 | Fed. Rep. of Germany . | |
| 3612777 | 10/1987 | Fed. Rep. of Germany | 267/148 |
| 2520304 | 7/1983 | France | 280/719 |
| 211922 | 7/1983 | United Kingdom . | |
| 0093707 | 5/1983 | World Int. Prop. O. . | |

Primary Examiner—Charles A. Marmor
Assistant Examiner—Karin Tyson
Attorney, Agent, or Firm—Marshall, O'Toole, Gerstein, Murray & Bicknell

[57] ABSTRACT

A suspension for a pair of wheels of a motor vehicle, comprising a spring (10,30) extending tranversely of the vehicle and supported by two mountings (11,12) spaced between the spring ends and which ends are connected, directly or indirectly, to wheel carrier members, wherein the spring has a portion (22,24) displaced out of the general line of adjacent parts of the spring to give a clearance from a part of the vehicle. The displaced part of the spring may be the entire central portion (40,50,60,100) thereof between its mountings (45,46,101) and end portions of the spring may be inclined to such central portion, so that the space directly between the wheels is clear of suspension parts.

3 Claims, 2 Drawing Sheets

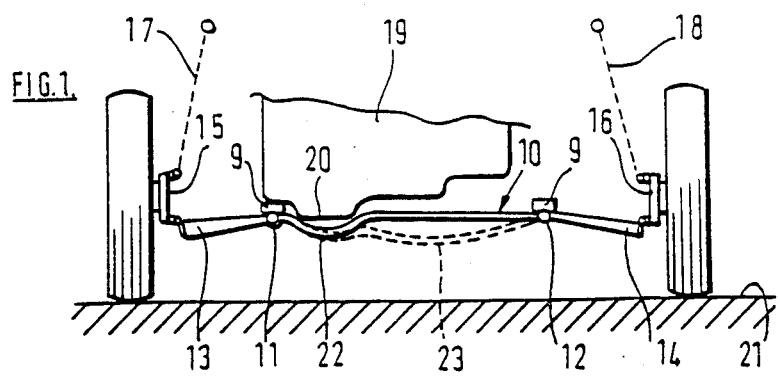
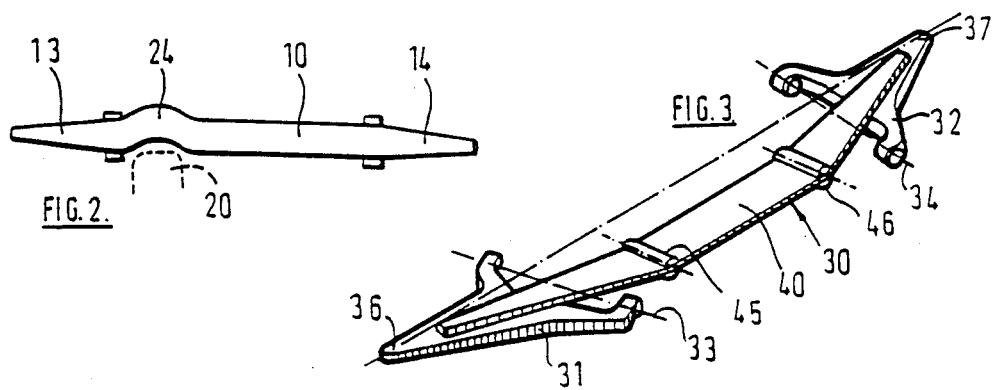
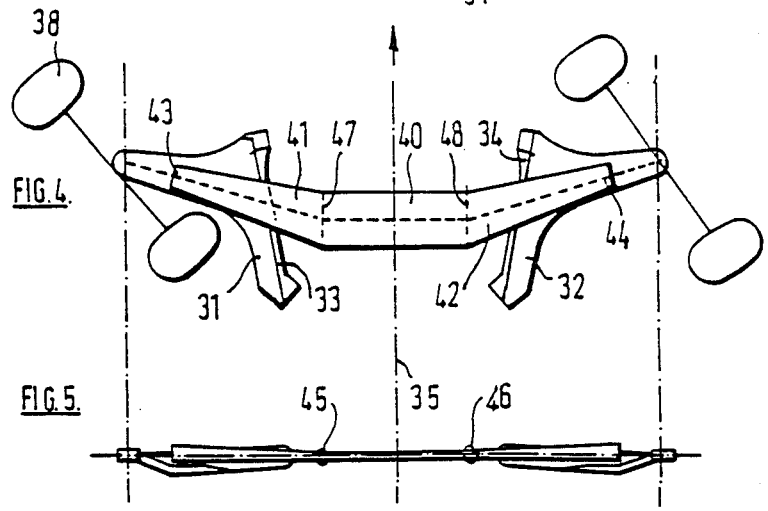

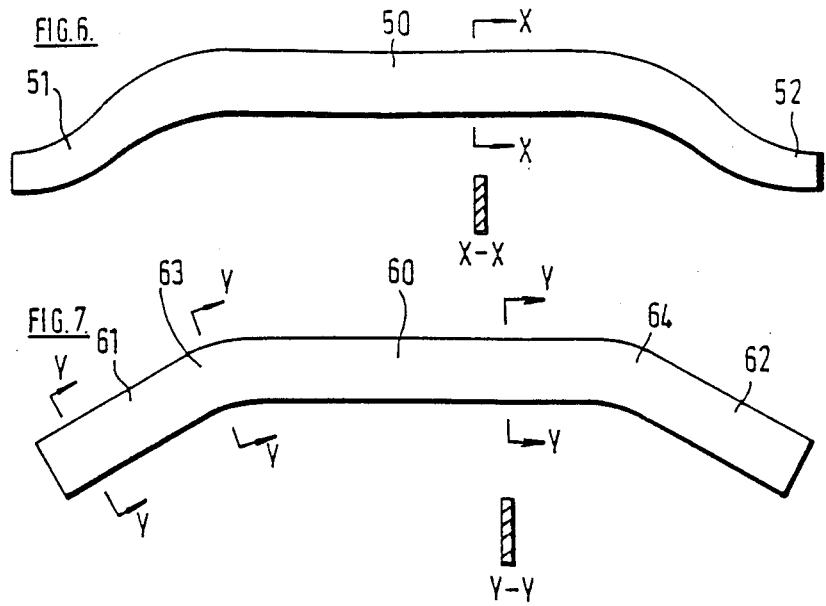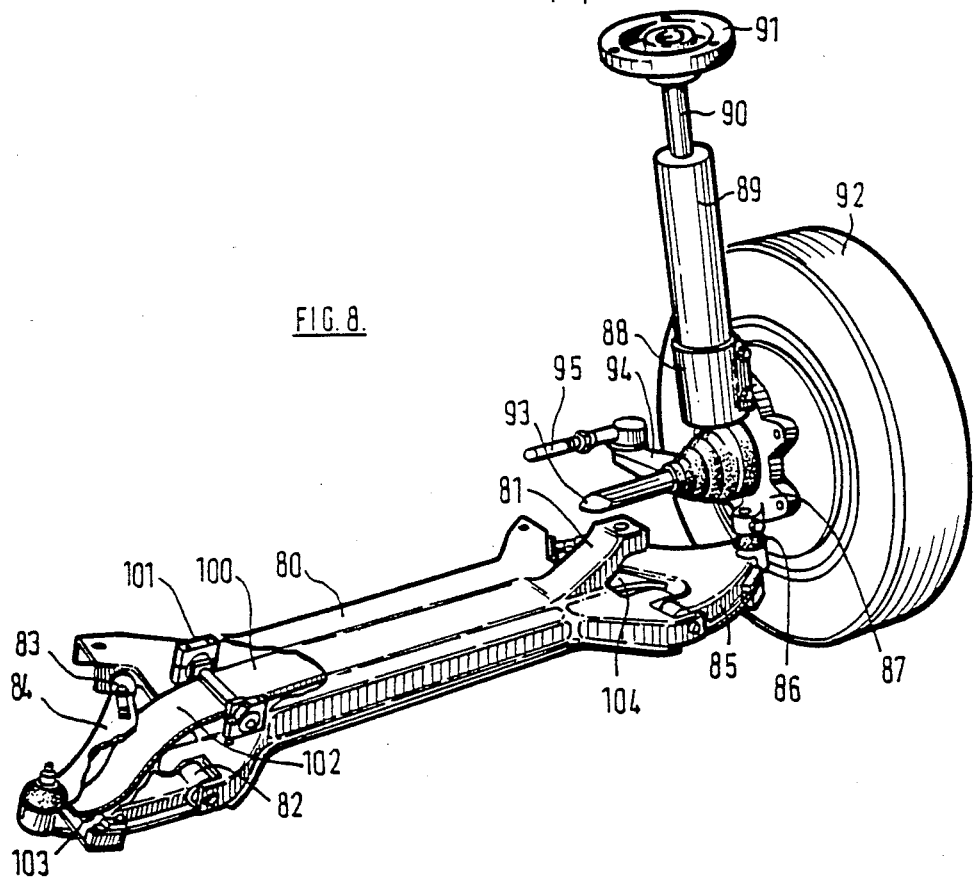

VEHICLE SUSPENSION

This invention relates to a suspension for a pair of wheels for a vehicle, including a leaf spring extending transversely of the vehicle and supported relative to the vehicle structure at two positions spaced from one another between the ends of the spring, end portions of the spring engaging respective wheel supporting members. For example, the spring end portions may be connected directly to wheel supporting members by suitable swivel joints, or may act on wishbones or other members or arrangements of members which in turn are connected to wheel supporting members. The invention has been developed in relation to the suspension for the front wheels of a motor vehicle such as a passenger car, but it will be appreciated that it is applicable generally where similar problems, as described hereafter, arise, possibly for the rear wheels of a motor car or for the wheels of trailers or semi-trailers.

An example of a vehicle suspension including a leaf spring disposed transversely of the vehicle as above set forth is disclosed in published International Patent Application No. WO83/01758. In that suspension the spring, which is of composite, fibre reinforced plastics material, is of constant cross-sectional shape between its positions of mounting to the vehicle structure. Outboard of such positions, towards its ends, the spring is of decreasing width in plan view and increasing thickness, maintaining a constant cross-sectional area. Such outboard portions act as relatively rigid suspension links (of the type generally known as wishbones) in use and eliminate the need for separate links. Springing is provided by deflection of the portion of the spring between its mountings to the vehicle structure. Each wheel carrier is also connected to the vehicle structure by a telescopic damper strut.

When such a suspension is used for the front wheels of a motor car, particularly one with front wheel drive, the spring may need to pass beneath the engine and/or gearbox of the vehicle. Typically the engine and/or gearbox has a portion which extends fairly close to the ground on which the vehicle stands, and may even be the part of the vehicle having the least ground clearance. If then the transverse spring has to be mounted beneath such part, the overall ground clearance of the vehicle can be reduced to an unacceptable level. Further, sufficient space has to be left between the spring and engine/gearbox to allow for bending of the spring in use, further reducing ground clearance. These problems exist for any suspension utilising a transverse leaf spring, whether of the type above described or one in which wishbones or like links are employed.

It is the object of the present invention to overcome or mitigate the above described ground clearance problem.

According to the invention, there is provided a suspension for a pair of wheels of a vehicle comprising a spring in the form of an elongate leaf extending transversely of the vehicle and supported relative to the vehicle structure, for pivotal movement about axes extending generally longitudinally of the vehicle, at two spaced positions between the ends of the spring to provide a central portion of the spring and two end portions thereof, said end portions of the spring engaging respective wheel supporting members, characterised in that the spring includes a part which is displaced out of the general line of adjacent parts of the spring, to provide a working clearance from a part of the vehicle.

Said displaced part of the spring may comprise a downwardly and/or forwardly or rearwardly extending curved part of said central portion of the spring.

In a suspension including such a spring, the spring as a whole can be mounted in the vehicle at a relatively higher position to provide, overall, an adequate ground clearance. Particularly with a spring made of composite, fibre reinforced plastics, material, and with appropriate dimensions and fibre disposition, stresses in the spring are not raised unacceptably.

The end portions of the spring may be inclined to said central portion thereof, as viewed in plan. In a suspension with such a spring, the central portion of the spring does not lie directly between the wheels, and hence the space directly between the wheels is available for the disposition of an engine, transmission or other vehicle part.

When the end portions of the spring are inclined to the central portion thereof, the forces imposed on the spring comprises primarily bending in the central portion of the spring, and bending and twisting in the end portions thereof. Once again, when the spring is of composite, fibre reinforced plastics, material, a suitable shape and disposition of fibres can be attained to withstand such forces.

The end portions of the spring may be generally straight, or may be curved, and such spring configurations are described hereafter.

The free ends or end portions of the spring may bear on pivoted arms or arm assemblies of the type generally known as wishbones, which are connected to hub assemblies which may be swivel hubs if the wheels are steerable. However, it would be possible for inclined end portions of the spring to be connected directly to wheel supporting members or swivel hub assemblies so that the end portions of the spring, in effect, also act as wishbones as disclosed in No. WO83/01758 aforesaid.

The invention will now be described by way of example with reference to the accompanying drawings, of which:

FIG. 1 is a diagrammatic elevation of a suspension according to the invention;

FIG. 2 is a plan view of the spring of the suspension of FIG. 1, showing a possible modification thereof;

FIG. 3 is a diagrammatic perspective view of part of a further embodiment of a suspension according to the invention;

FIGS. 4 and 5 are, respectively, plan and elevational views of the suspension parts of FIGS. 3;

FIGS. 6 and 7 are plan views of further embodiments of spring for use in the suspension of FIGS. 3 to 5;

FIG. 8 is a diagrammatic perspective view of a practical embodiment of suspension according to the principles of FIGS. 3 to 6.

Referring firstly to FIG. 1 of the drawings, the suspension there illustrated is of the general type disclosed in the International published patent application aforesaid, Publication No. WO83/01758. Thus it comprises a spring 10 extending transversely of the vehicle, supported relative to the vehicle structure (not shown) at two positions 11, 12 spaced transversely of the vehicle from one another and from the ends of the spring. Outboard of the support positions 11, 12, towards the ends of the spring, the spring has portions 13, 14 which are of decreasing width in plan view and increasing thickness. The portions 13, 14 are pivotally connected to respective wheel carriers 15, 16, and the wheel carriers are also connected to the vehicle structure by telescopic damper struts positioned as indicated at 17, 18. The vehicle includes an engine and gearbox unit, part of which is indicated at 19. This may be a transversely mounted unit, as usually employed in front wheel drive vehicles. The unit 19 has a part 20 which is the lowest part of the unit, closest to the ground surface 21 on which the vehicle stands. It will be appreciated that if the part of the spring 10 between the support positions 11, 12 were generally straight, the spring as a whole would have to be mounted in the vehicle at a low level leading to a small ground clearance across the whole width thereof, and particularly a low ground clearance at the spring centre when it is bent downwardly between its ends.

According to the invention, the spring has a portion 22 in the form of a downwardly extending curve, beneath the part 20. The portion 22 of the spring gives sufficient clearance from the part 20 to permit deflection of the spring in use, and enables the rest of the spring to be mounted at a higher position in the vehicle.

The configuration of the spring 10 when deflected in use is indicated at 23 in the drawing. It will be understood that the ground clearance at the centre thereof under such conditions is not reduced below an acceptable value, as would be the case if the whole spring had to be mounted at a lower level to clear the part 20. This is possible because the part 20 is not at the transverse centre of the vehicle.

A spring 10 of composite, fibre-reinforced plastics material, manufactured by a method including a moulding process, can readily be formed with a curved portion 22. With suitable selection of spring dimensions, the presence of portion 22 does not unacceptably add to stresses in the spring in use.

Referring now to FIG. 2 of the drawings, a modification of the spring in the suspension of FIG. 1 is shown wherein the spring has a portion 24 of a rearwardly extending curve displaced from the general line of the spring part 10. The portion 24 of the spring gives sufficient clearance from the part 20 to permit deflection of the spring in use, and enables the spring as a whole to be mounted at a high enough position in the vehicle to give sufficient ground clearance.

In further modifications, the spring may include a portion displaced in any direction from the general line of the spring, to give clearance from any vehicle part.

Referring now to FIGS. 3, 4 and 5 of the drawings, there is illustrated part of a suspension for the front, steerable, wheels of a motor vehicle. It comprises a spring 30 which extends transversely of the vehicle, and two wishbones 31, 32 which are pivotally connected to the structure, not shown, of the vehicle. The pivotal axes of the wishbones are indicated at 33, 34 and they extend generally longitudinally of the vehicle. The outboard ends 36, 37 of the wishbones would be connected by swivel joints to hub assemblies, not shown, to provide for steering of wheels 38, 39 of the vehicle, the hub assemblies further being supported relative to the vehicle structure by further wishbones or damper struts.

The spring 30 comprises a central portion 40 which extends transversely of the vehicle, perpendicular to the centre line 35 of the vehicle, and two end portions 41, 42 which are inclined to the centre portion 40, extending outwardly and forwardly therefrom as viewed in plan. The free ends 43, 44 of the spring engage the wishbones 31, 32, respectively. The spring is supported relative to the vehicle structure by two mountings indicated generally at 45, 46, to provide for limited pivotal movement of the spring relative to the vehicle structure about two axes 47, 48 parallel to and spaced symmetrically from the centre line 35. In known manner, such a mounting of the spring resists roll of the vehicle as well as providing vertical springing thereof.

The spring 30 is made of composite, fibre-reinforced plastics, material. In this example, its centre portion 40 is of constant cross-sectional shape between the mountings 45, 46, while the end portions 41, 42 thereof are tapered, becoming narrower in plan view and thicker in elevation towards the free ends of the spring. Such a shape of spring may be made of composite material by, for example, a pulforming technique, the cross-sectional area of the spring being constant throughout its length. The tapering configuration of the spring end portions is particularly advantageous in that it provides an increased clearance for steering of wheels 38, 39, this being particularly apparent for wheel 38 in FIG. 2 of the drawings.

Referring now to FIG. 6 of the drawings, there is shown a further embodiment of spring according to the invention, again comprising a central portion 50 and end portions 51, 52. End portions 51, 52 are inclined to the centre portion 50 but are of curved form instead of being straight. The cross-sectional shape of the spring centre portion is shown in the section X—X inset to FIG. 4, and the end portion 51, 52 may be of the same cross-sectional shape or may vary, e.g. as in the embodiment above described.

Referring now to FIG. 7, there is shown a spring with a centre portion 60 and end portions 61, 62. The end portions are straight and inclined to the centre portion of the spring, being connected thereto by curved transition portions 63, 64. The cross-sectional shape of the spring is constant throughout its length, as shown at Y—Y inset to FIG. 5.

It is contemplated that springs of the shape shown in FIGS. 6 or 7 may be manufactured by laying-up a web of fibres which includes fibres extending in different directions. Thus there may be achieved a spring wherein the end portions thereof contain fibres which extend at an inclination to the general length of the end portions. This results in the end portions being sufficiently strong to resist twisting, which arises therein as a consequence of their inclination to the centre portion of the spring.

It is contemplated that all the embodiments of spring above described may be mounted relative to the vehicle structure at positions at or adjacent the transition between the central and end portions of the springs. The mountings provide for limited pivotal movement of the springs about axes extending generally longitudinally of the vehicle, but such axes need not be parallel to the centre line of the vehicle as in the embodiment of FIGS. 1 to 3. By changing the orientation of such pivotal axes, changes in the effective stiffness of the springs may be achieved.

Referring now to FIG. 8 of the drawings, there is shown, in perspective view and partially broken away for clarity, a practical embodiment of suspension incorporating a spring somewhat as shown in FIG. 6 of the drawings.

The suspension comprises a sub-frame 80 extending transversely of the vehicle, fabricated by welding together of metal pressings so that it is of hollow form. One end of the sub-frame 80 is illustrated with part of it broken away to show the interior thereof, and at the other end is illustrated a formation 81 for mounting the sub-frame to a vehicle structure. At one end of the sub-frame 80 there is pivotally mounted, by spaced pivot bush assemblies 82, 83, a suspension arm 84, and at the opposite end of the sub-frame there is similarly pivotably mounted a suspension arm 85. The suspension arms are able to pivot about axes extending generally fore and aft of the vehicle. The suspension arm 85 is shown, e.g. attached, by a swivel ball joint 86, to a wheel carrier member 87 which is further attached by a clamp 88 to the outer member of a telescopic damper strut 89 whose inner member, 90, has a mounting 91 for connection to an appropriately disposed part of the vehicle structure. The wheel carrier member 87 is thus able to undergo steering swivelling movement as well as vertical movement relative to the structure of the vehicle.

Also shown in association with wheel carrier member 87 is a wheel 92 carried by suitable bearings, a drive shaft 93 by which the wheel is to be driven through a suitable constant velocity ratio universal joint, and a steering arm 94 connected by a swivel joint to a steering link 95.

Within the sub-frame 80 there is disposed a spring whose configuration is as that above described with reference to FIG. 6. The spring is supported within the sub-frame by two mounting assemblies, one of which is indicated at 101, such mounting assemblies being disposed at the ends of the straight transversely extending central portion (100) of the spring and each providing for limited pivotal movement of the spring about a respective axis extending fore and aft of the vehicle. For example, the mounting assembly may include elements between which the spring is clamped, typically with the interposition of an elastomeric element or elements, which elements are themselves pivotable by virtue of being held in a support such as an elastomeric bush. The curved end portion (102) at the fully visible end of the spring extends into the suspension arm 84 which is of hollow configuration, and the end of the spring bears downwardly on a part of the suspension arm at 103 where a suitable abutment structure would be provided. In the drawing, the opposite curved end (104) of the spring is visible where it enters the suspension arm 85.

As for the theoretical embodiments of the invention above described, that of FIG. 8 leaves a substantially clear space directly between the wheels of the pair, so that such space can be occupied by, e.g. an engine or transmission unit of the vehicle. The main part of the subframe 80 containing the central portion 100 of the spring is disposed somewhat to the front or rear of the wheel centres, where in many vehicles it may be accommodated more readily.

We claim:

1. A suspension for suspending a pair of wheels of a vehicle relative to the structure of the vehicle, comprising:
    a spring in the form of an elongate leaf, made of fibre-reinforced plastics material and extending transversely of the vehicle;
    the spring comprising a central portion and two end portions, the end portions extending from respective ends of the central portion of the spring at opposite sides of the vehicle;
    respective means supporting the spring at the ends of the central portion thereof, for pivotal movement about respective axes extending generally longitudinally of the vehicle;
    respective arm members pivoted to the vehicle structure and connected to wheel carrier members for the wheels of the vehicle;
    the spring end portions bearing on the pivoted arm members, whereby when the arm members are caused to pivot the central portion of the spring is caused to undergo bending deflection; and
    the end portions of the spring being inclined to the central portion thereof, considered in plan view, whereby the central portion of the spring is spaced transversely of the vehicle an inward of the centres of the wheels.

2. A suspension for suspending a pair of wheels of a vehicle relative to the structure of the vehicle comprising:
    a sub-frame extending transversely of the vehicle;
    a spring in the form of an elongate leaf, made of fibre-reinforced plastics material and extending transversely of the vehicle, the spring comprising a central portion and two end portions thereof, the end portions extending from respective ends of the central portion of the spring at opposite sides of the vehicle;
    respective means supporting the spring relative to the sub-frame at the ends of the central portion of the spring, for pivotal movement about respective axes extending generally longitudinally of the vehicle;
    respective arm members pivoted to the sub-frame and connected to wheel carrier members for carrying the vehicle wheels;
    the end portions of the spring bearing on the pivoted arm members, whereby when the arm members pivot the central portion of the spring is caused to undergo bending deflection; and
    the end portions of the spring being inclined to the central portion thereof, considered in plan view, whereby the central portion of the spring is spaced transversely of the vehicle and inward of the centres of the wheels.

3. A suspension according to claim 2 wherein the sub-frame is of hollow configuration and at least the central portion of the spring is disposed therewithin.

* * * * *